United States Patent
Blucher

(10) Patent No.: US 7,163,120 B1
(45) Date of Patent: Jan. 16, 2007

(54) CONTOUR FIT PAN LINER FOR A FOOD SERVICE PAN

(75) Inventor: Timothy L. Blucher, Harleysville, PA (US)

(73) Assignee: M&Q Plastic Products, Inc., North Wales, PA (US)

( * ) Notice: Subject to any disclaimer, the term of this patent is extended or adjusted under 35 U.S.C. 154(b) by 404 days.

(21) Appl. No.: 09/491,639

(22) Filed: Jan. 27, 2000

(51) Int. Cl.
B65D 25/16 (2006.01)

(52) U.S. Cl. .................................................. 220/573.4

(58) Field of Classification Search ............. 220/573.4, 220/495.06, 495.11, 495.03; 383/104, 122, 383/121
See application file for complete search history.

(56) References Cited

U.S. PATENT DOCUMENTS

| | | | |
|---|---|---|---|
| 1,245,670 A | 11/1917 | Brown | |
| 1,600,741 A | 9/1926 | Sherman | |
| 2,542,413 A * | 2/1951 | Ibsch, Jr. | |
| 2,669,914 A | 2/1954 | Swaine | ........................ 93/51 |
| 2,802,617 A * | 8/1957 | Roper | |

(Continued)

FOREIGN PATENT DOCUMENTS

EP 0 330 785 A2 9/1989

(Continued)

OTHER PUBLICATIONS

Supplementary European Search Report, from European Application No. 01946826.3, mailed Feb. 27, 2003, 3 pages.

Primary Examiner—Stephen Castellano
(74) Attorney, Agent, or Firm—Sterne, Kessler, Goldstein & Fox P.L.L.C.

(57) ABSTRACT

An apparatus, system, and method for forming an improved barrier between a pan, such as a food service pan, and a substance, such as food, contained therein using a contour fit pan liner are provided. The apparatus includes a pan liner having a contoured bottom edge that is custom fit within a food service pan to cover an interior surface of the pan. The contoured edge of the pan liner conforms to the shape and size of the food service pan and does not have any dog ears, ears, or tails that are typical of conventional pan liner. The contour fit pan liner system includes a pan and a contoured or shaped liner for forming an improved barrier between an interior surface of the pan and food that can be disposed therein using a pan liner having a contoured bottom edge that is custom fit to the shape and size of the pan. The pan preferably includes a food service pan having a bottom panel, one or more side walls extending upwardly from the bottom panel, a top opening defined by top edges of the side walls, and a flange extending outwardly from the top edges of the side walls. The liner includes a bag shaped structure having a closed bottom end, a contoured bottom edge, one or more side walls extending upwardly from the contoured bottom edge, and a top opening defined by the top edges of the liner side walls. The contoured bottom edge does not have dog ears formed at the bottom corners of the liner, as is typically of conventional pan liners. The liner is disposed within the food receptacle area of the pan to cover the interior surface of the pan and the top of the liner is folded over the top opening of the pan. A method for making an improved contour fit pan liner having a contoured bottom edge is disclosed.

43 Claims, 12 Drawing Sheets

U.S. PATENT DOCUMENTS

| | | | | |
|---|---|---|---|---|
| 2,939,606 A | | 6/1960 | Durbin | 220/63 |
| 3,155,304 A | | 11/1964 | Beerend | 229/3.1 |
| 3,357,152 A | * | 12/1967 | Geigel | 53/452 |
| 3,435,736 A | * | 4/1969 | Reiche | |
| 3,534,666 A | * | 10/1970 | Maccherone | |
| 3,549,451 A | * | 12/1970 | Kugler | |
| 3,599,538 A | * | 8/1971 | Piazze | 493/194 |
| 3,601,280 A | | 8/1971 | Mills | 220/63 R |
| 3,677,438 A | | 7/1972 | Esposito | 221/63 |
| 3,724,711 A | | 4/1973 | George et al. | 220/63 R |
| 3,828,966 A | | 8/1974 | Martin | 220/7 |
| 3,934,748 A | | 1/1976 | Racz | 220/9 R |
| 4,320,699 A | | 3/1982 | Binks | 99/349 |
| 4,434,197 A | | 2/1984 | Petriello et al. | 427/407 |
| 4,759,642 A | * | 7/1988 | Van Erden et al. | 383/210.1 |
| 4,794,052 A | | 12/1988 | Morrison | 428/595 |
| 4,828,134 A | | 5/1989 | Ferlanti | 220/83 |
| 4,877,010 A | | 10/1989 | Hait | 126/9 A |
| 4,932,556 A | | 6/1990 | Hui et al. | |
| 5,613,427 A | | 3/1997 | Wiley | 99/446 |
| 5,944,251 A | | 8/1999 | LaFleur | 229/117.35 |
| 6,120,183 A | * | 9/2000 | Buchanan et al. | 383/122 |

FOREIGN PATENT DOCUMENTS

EP 0 330 785 A3 9/1989

* cited by examiner

CONTOUR FIT PAN LINER FOR A FOOD SERVICE PAN

FIELD OF THE INVENTION

The present invention relates in general to the culinary arts, primarily to an improved pan liner for food service applications. More particularly, the present invention relates to a flexible contour fit pan liner that fits within a food service pan to form a barrier between food placed within the pan and the interior surfaces of the pan.

BACKGROUND OF THE INVENTION

Large food service pans for cooking, serving and storing food have been used for many years in commercial food service establishments. These pans can be used in food servers, such as steam tables, buffet tables, chill tables, salad bars, and the like, as well as used as chafing dishes in chafers. In these applications, the food service pans can contain multiple portions of food, allowing it to be served one portion at a time. These pans may be used to cook and heat food, for the storage of food, and/or as transfer pans to carry large portions of food to and from a serving area. Conventional metal (e.g., stainless steel) food service pans can include a variety of shapes, including rectangular and circular shaped pans having an open top. A flange typically extends around the circumference of the open pan top to hold the pan in the steam or buffet table, to provide a steam seal around a steam table, and/or to offer a convenient lifting and carrying point. When used in a steam table, buffet table, salad bar, or the like, the pan body (e.g., the food receptacle portion) and flange are typically dimensioned so that the receptacle is received into an opening in the table or bar and is supported by its flange resting upon the edges of the table or bar opening.

Liners may be provided for these pans to keep food separate from the metal surfaces of the pan thereby improving food safety and quality, enhancing flavor and juiciness of foods, minimizing clean up time and resource consumption, and reducing shrinkage by allowing left over food to be removed from the pan and saved for further use. Pan liners are typically used in food preparation (cooking) and holding to prevent food from "baking-on" and "burning-on" to the pan surface.

Various types of flexible sheets, films, and liners have been devised in the past for preparing, cooking, and/or storing foods therein or in pans, trays, or the like provided with liners made from such sheets. For example, paper sheets of cellulosic fibers have been used, as well as various types of thermoplastic and thermosetting films. Moreover, thin metal foils, so-called tin foils, which are in reality thin sheets of aluminum, are extensively used for cooking, heating, and storing foods.

Various difficulties have arisen through the use of such sheets, films, and liners made therefrom. For example, metal foils are notoriously easy to crack and break, so that foods wrapped therein frequently are not fully protected by the foil. Such sheet liners and foil are not easy to wrap closely around irregularly shaped pans and the like, and are also easily damaged by serving utensils that may scrap along the surface of the liner. In addition, sheets or liners made form metallic materials are generally relatively expensive as compared to other types of liner materials.

While paper sheets are useful for a variety of culinary purposes, their moisture and air transmissibility allow rapid spoilage of food contained therein as well as soiling of the pan surface. In addition, paper liners are typically not suited for high temperature cooking applications and also tear easily.

Thermoplastic films with slightly greater durability, such as polyethylene films and the like, are used for preparing, cooking, and storing foods. However, a problem with conventional pan liners is that they typically do not conform to the shape and contour of the pan or food receptacle that they are use with. Flat sheet liners and also conventional bag-shaped liners do not always adequately cover the food holding surface of the pan interior. This can result in soiling of the pan thereby requiring time-consuming, difficult, and expensive cleaning of the pan, thus defeating the purpose behind using a pan liner in the first place. Also, conventional liners that are not properly fitted to the pan can fall back into the pan and the food contained therein. These problems are especially true for sheet type plastic liners that have a substantially flat planar construction.

The most common bag-shaped liners have a substantially tubule shaped body sealed at a bottom end and open at an opposite top end. These liners are generally formed having substantially right angled corners formed where the side walls of the liner connect with the bottom end. Typically, a liner is disposed within the receptacle of the pan to line and cover an interior surface of the receptacle and the top portion of the liner is folded over the top edge and flange of the pan such that the excess liner material skirts the flange and exterior surface of the receptacle.

A problem with conventional pan liners having a bag-like shape is that they typically include "dog ears, ears, or tails" that are formed during the construction of the liner. These "dog ears" are pockets that are formed in the corners of the liner at the closed bottom end. The corners of conventional liners (e.g., where the bottom edge meets the side walls) are typically formed at right angles. "Dog ears" are problematic in that food can become trapped in this area of the liner leading to waste of the food caught in this area and also jeopardizing the quality and safety of the food. In addition, serving utensils can become caught on the "dog ear" which may disturb or tear the liner.

There is a need, therefore, for an improved food service pan liner, and method for making the improved pan liner. In particular, there is a need for a simple, flexible, replaceable, and durable pan liner having non-stick and high temperature attributes, that conform to the shape, size, and contour of the pan and food receptacle and that does not include the problematic "dog ears" found in conventional bag liners.

SUMMARY OF THE INVENTION

The present invention is directed to a contour fit pan liner, a contour fit pan liner system, and a method of making the contour fit pan liner for forming an improved barrier between the interior surfaces of a food service pan and food disposed therein. The contour fit liner of the present invention includes a generally tubular, or bag-like, shaped liner body having a closed bottom end, one or more side walls extending upwardly from the closed bottom end, and an open top end. The closed bottom end includes a contoured, or shaped, bottom edge that is constructed to custom fit the receptacle of a food service pan.

Preferably, the contoured bottom edge includes a flat bottom end and one or more contoured edges. Each contoured edge extends outward and upward from and opposite end of the flat bottom edge and is merged and joined with the flat bottom edge. Each contoured edge is merged and joined at its opposite end with an edge of the side walls. The contour fit liner is then removably disposed within the receptacle of the pan. The closed bottom edge being disposed generally over the interior surface of a bottom panel of the food service pan, the liner side walls being disposed generally over one or more side walls of the pan, and the top end and top opening extending upwardly beyond a top opening of the pan. The liner top end is folded outwardly over the pan top opening.

Preferably, each of the contoured edges can include a substantially straight tapered edge. Each of the tapered edges can be formed having a predetermined angle from a plane defined by the flat bottom edge, wherein the angle is predetermined based on the shape and size of the pan. Alternatively, each of the contoured edges can include a curved edge. Each of the curved edges can be formed having a radius that is predetermined based on the shape and size of the pan.

The pan liner system of the present invention includes a food service pan and a contour fit pan liner for holding food within the pan and for forming an improved barrier between the food and the interior surface of the food service pan. The pan includes a bottom panel, one or more side walls extending upwardly from the bottom panel, a pan top opening defined by the one or more side walls, and a flange extending outwardly from an upper end of the one or more side walls.

The contoured fit pan liner is preformed having a generally tubule shape body having a closed bottom end, one or more upwardly extending side walls, and an open top end. The closed bottom end includes a contoured or shaped bottom edge that is disposed generally over the interior surface bottom panel of the pan. The one or more side walls are disposed generally over the one or more side walls of the pan. An opening is formed by the one or more liner side walls at the top end of the liner. The top end extends upwardly beyond the top opening of the pan and the liner can be folded outwardly over the top edge of the pan. The contour fit pan liner does not have dog ears formed proximate the closed bottom end, as is typical of conventional bag-type pan liner.

Preferably, the contour fit pan liner is removably disposed within the pan. This allows left over or unused food to be removed by lifting out the liner and storing the food for future use.

Preferably, the pan liner is made from a high temperature plastic material, such as a high temperature nylon resin material. The liner material should be suitable for food cooking and food preparation. Preferably, the high temperature liner can withstand a temperature of about 400° F.

Another embodiment within the scope of the present invention is directed to a method for making a pan liner having a contour fit for forming an improved barrier over an interior surface of a food service pan. The method includes providing two overlying sheets of plastic liner material, forming a substantially tubular shaped liner defining a food holding vessel between the overlying sheets of liner material by, closing a bottom end, the closed bottom end preferably including a flat bottom edge and two contoured edges extending outward and upward from the flat bottom end, wherein each of the contoured edges closes off a dog ear portion of the tubular shaped liner, closing one or more side walls formed by the overlying sheets of liner material extending upward from the closed bottom end, the side wall being closed along one or more side wall edges extending upward from each of the contoured edges, and forming an open top end defined by a top edge of the side walls of the liner.

The method can further include forming a perforation along each of the sealed contoured edges on the dog ear side of the sealed contoured edge. The perforation can allow for easy removal of the material of the dog ear prior to using the liner. In addition, the method can include removing the dog ears formed by the contoured edges on a side of the sealed contoured edge opposite the tubular shaped liner. The material of the dog ear can be removed by, for example, cutting the dog ear off during the manufacturing process.

The method can further include forming each of the contoured edges having a tapered edge that extends outward and upward from opposite ends of the flat bottom edge at a predetermined angle from a plane defined by the flat bottom edge, the angle being predetermined based on a shape and a size of the pan. Alternatively, the method can include forming each of the contoured edges having a curved edge that extends outward and upward from opposite ends of the flat bottom edge and a predetermined radius of curvature, the radius of curvature being predetermined based on a shape and a size of the pan.

The edges of the contour fit liner can be closed by sealing the edges using one of heat or thermo-sealing, impulse-sealing, sonic-sealing, and RF-sealing. Alternatively, other suitable conventional techniques can be used to close the liner edges, such as bonding, adhesion, etc.

A further embodiment within the scope of the present invention is directed to a method of forming an improved barrier between an interior surface of a food service pan and the food that is disposed within the food service pan. The method includes providing a pan having a bottom, one or more side walls extending upwardly from the bottom, and an opening defined by an upper edge of the side walls, disposing a liner having a contoured or shaped body including a closed bottom end, one or more side walls extending upwardly from the bottom end, and an opening defined by an upper edge of the liner side walls, and folding the upper edge of the liner side walls over the pan upper edge. Preferably, the closed bottom end includes a flat bottom edge and one of more contoured edge connecting opposite ends of the flat bottom edge to one or more edges of the side walls. The contour fit liner forms an improved barrier between the pan and food disposed therein because the contour fit liner does not include dog ears, which are typical of conventional bag-shaped liners. The dog ears are closed off or eliminated by the contoured edge of the closed bottom end.

BRIEF DESCRIPTION OF THE DRAWINGS

The foregoing and other aspects of the present invention will become apparent from the following detailed description of the invention when considered in conjunction with the accompanying drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF PREFERRED EMBODIMENTS

Figure 1:
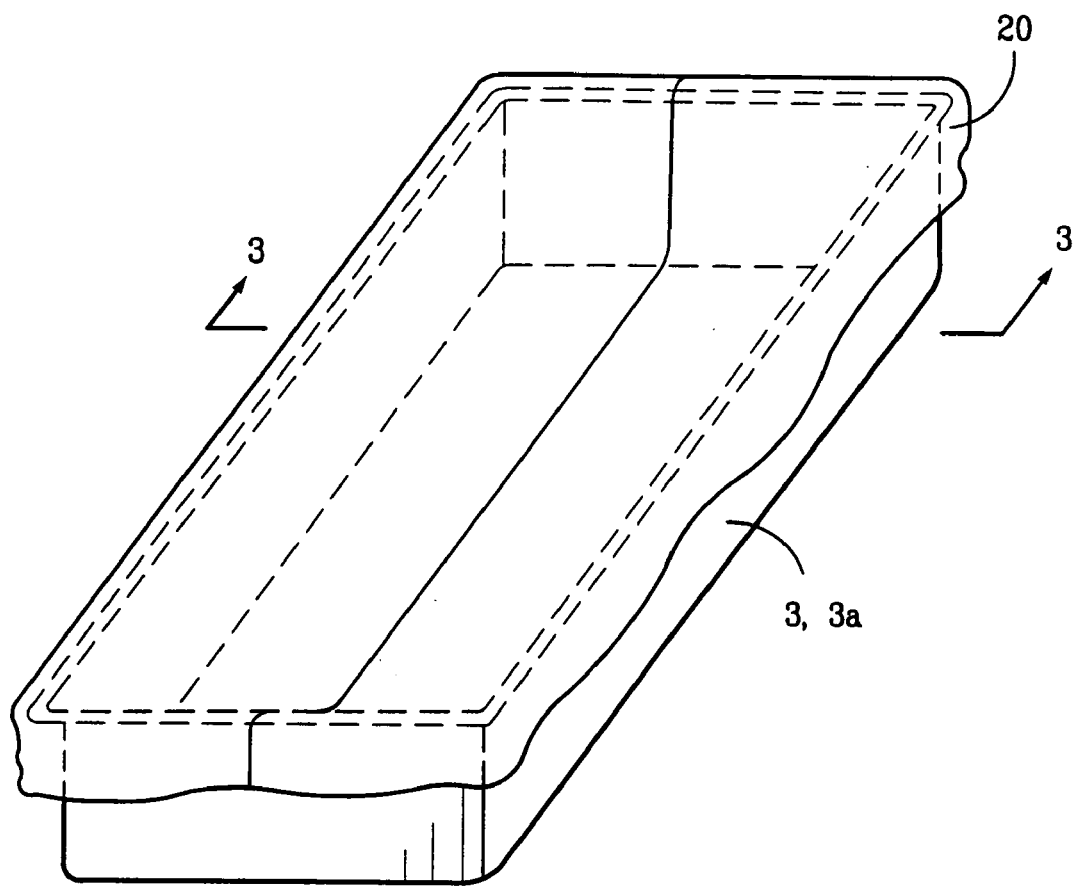
FIG. 1 is a perspective view of an exemplary pan liner system in accordance with the present invention.

The present invention is directed to a pan liner having a contour fit, a pan liner system having a pan and contour fit pan liner for forming an improved barrier between the pan and food disposed therein, and a method for making the contour fit pan liner. The contour fit pan liner is used primarily with food service pans and functions to hold food within the pan receptacle and to form a barrier between the interior surfaces of the pan and food that is disposed therein. The contour fit pan liner has a substantially tubular or bag shaped body which is formed without dog ears, which are typical of conventional bag shaped pan liners. The pan liner is formed having a contoured bottom edge which provides an improved fit of the liner to the pan and also helps prevent food from becoming trapped in the bottom corners of the liner, because these corners have been closed off or eliminated by the contoured bottom edge. In addition, serving utensils no longer become caught in these corner areas of the pan liner, again because these corners have been eliminated by the contoured bottom edge. This helps maintain the integrity of the barrier formed by the liner between the metal surface of the pan and food that may be placed in the pan. The contour fit pan liner thereby improves food safety and helps maintain food quality, reduces shrinkage, and also reduces labor costs and resource consumption.

FIGS. 1 through 6 show an exemplary food service pan liner system in accordance with the present invention which uses a high temperature pan liner having a contour fit to form an improved barrier between the food service pan and food which may be disposed within the pan. As shown in FIGS. 1 through 6, each exemplary pan liner system 2 including a pan 3 and a contour fit liner 20. The flexible pan liner 20 is removably disposed inside the pan 3 such that it covers an interior surface of the pan 3 and holds food (not shown) that can be disposed within the pan 3. The closed bottom end of the liner 20 is constructed having a contoured or shaped bottom edge which provides an improved or to custom fit of the liner 20 to a pan or receptacle thereby minimizing the problems associated with conventional pan liners which do not properly fit within the pan and which have dog ears formed at the right angle corners of the liner bottom. The liner 20 is generously sized in relation to the pan 3 such that the open top end of the liner 20 can be folded outwardly over the top edge of the pan 3 top opening. After use, the liner 20, and any remaining food, can be removed from the pan 3, and the liner 20 can be used to store the remaining food for future used.

FIGS. 1 through 7 show exemplary pans 3. As shown, pan 3 includes a bottom panel 4, one or more side walls 5 extending upwardly from bottom panel 4, and a pan top opening 6 defined by top edges 7 of the one or more side walls 5. The pan bottom 4 and side walls 5 define a receptacle 8 that is constructed to receive and hold multiple servings of food (not shown) that can later be served a single-serving at a time. The pan 3 also preferably includes a flange 9 extending outwardly from top edge 7 of each of the side walls 5 and terminating at an outer edge 10. The flange 9 provides a convenient lifting and carrying point and provides a ledge for holding the pan 3 in, for example, a steam or buffet table (not shown).

Pan 3 preferably includes a metallic material, preferably made of stainless steel, such as those currently used in the food service industry for food preparation (e.g., cooking), serving, and transport. Alternatively, the pan 3 can be made from any material that is suitable for high temperature food service applications, such as for example, glass, plastics, ceramics, etc. The pan 3 can be removably positioned in, for example a steam table, a buffet table, a chafer, or mounted in some other holder.

An exemplary metal pan 3 can be formed from an initially flat sheet of metal by one or more draws between a punch and die to have a perimetric wall structure 5 and an outwardly-extending flange 9 at the top 7 thereof.

Figure 2:
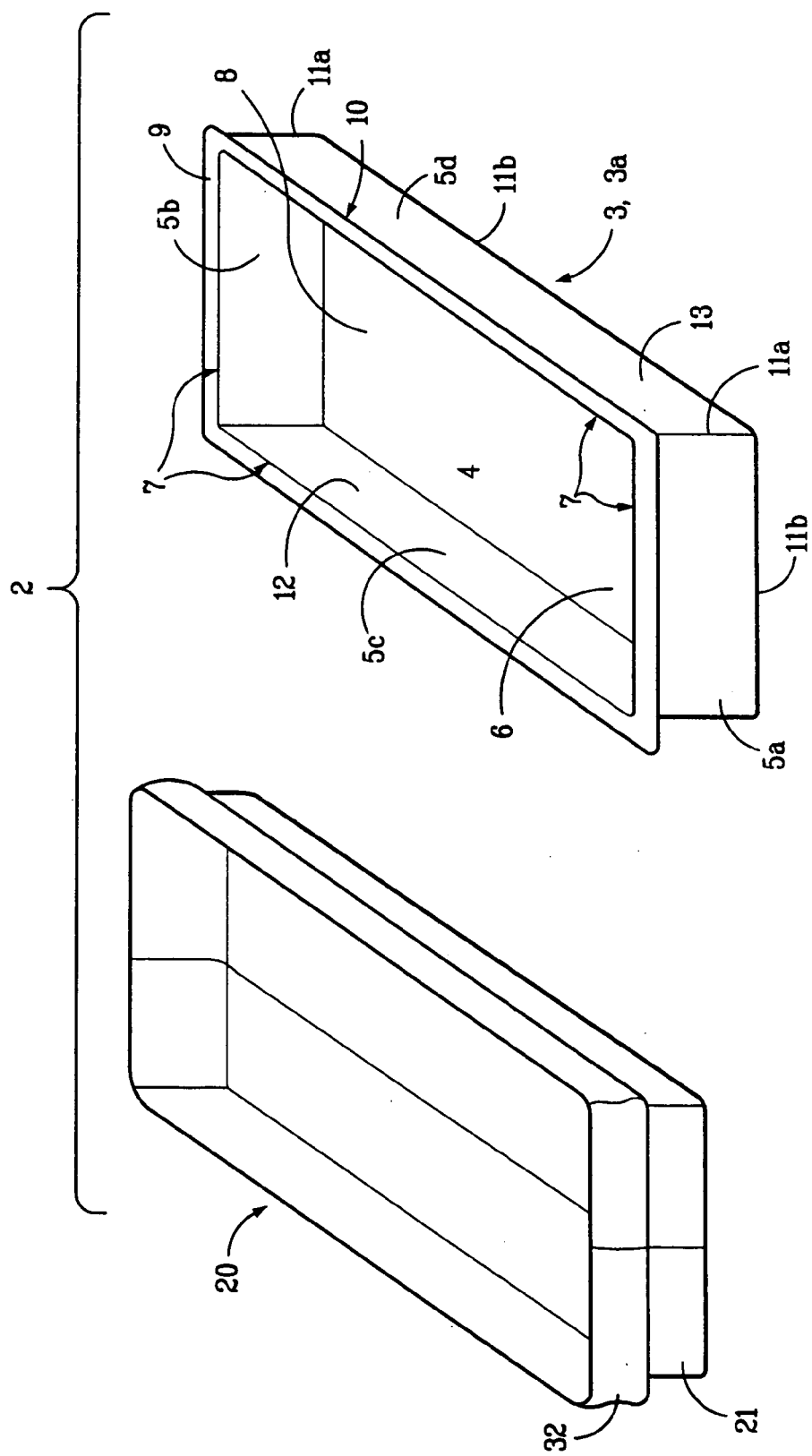
FIG. 2 is an exploded perspective view of the pan liner system of FIG. 1.
Figure 3:
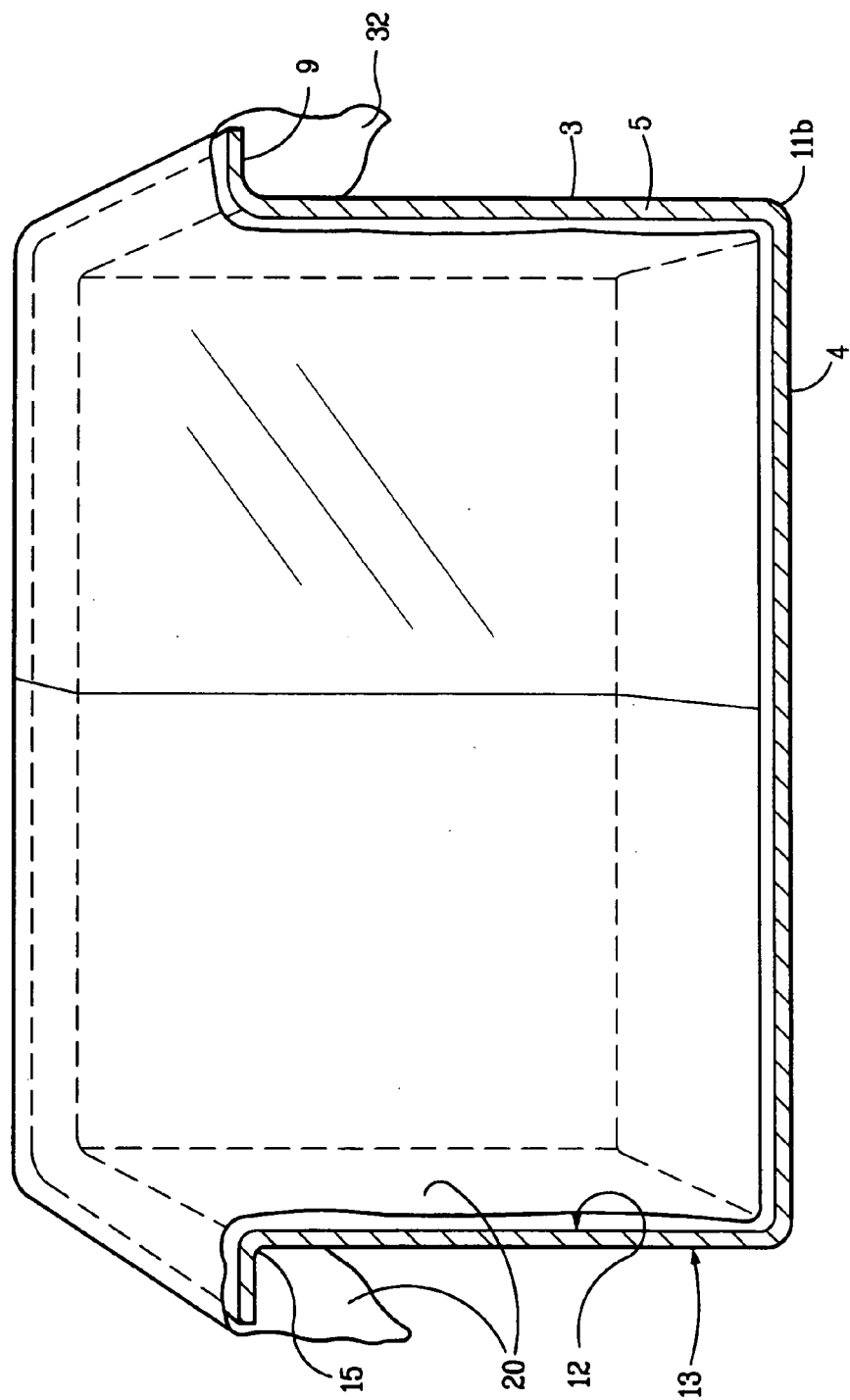
FIG. 3 is a cross sectional view of the pan liner system of FIG. 1 taken along sectional line 3—3.

FIGS. 1 through 3 show an exemplary rectangular shaped pan liner retention system. As shown in FIGS. 1, 2, and 3, the rectangular pan 3a includes a rectangular shaped planar bottom panel 4, front 5a, rear 5b, first, or right 5c, and second, or left 5d side walls extending upwardly from bottom panel 4. The front 5a, rear 5b, right 5c, and left 5d side walls are joined and merged together at corners 11a. The side walls 5a, 5b, 5c, 5d are joined to and merged with bottom panel 4 at corners 11b. Preferably, corners 11a, 11b are formed as curved, or rounded corners.

As shown, each side wall 5a, 5b, 5c, 5d terminates at top edge 7, and the top edges 7 define the top opening 6, which is generally rectangular in shape, with the possible exception of the corners, which may be curved. Flange 9 extends outwardly from top edge 7 around the entire periphery of the side walls 5a, 5b, 5c, 5d. Flange 9 is joined to and merged with side walls 5a, 5b, 5c, 5d at corners 15. Preferably, corners 15 are formed as curved, or rounded corners.

As shown, flange 9 can include a substantially continuous planar surface that is constructed to be in intimate, uninterrupted contact with an upper surface of a steam, or buffet, table (not shown) that the pan may be placed in contact with. The interface between the pan flange 9 and the steam table preferably forms a seal between the pan and the steam table. The flange 9 terminates in an outer edge 10. Preferably, the flange 9 defines a plane that is substantially parallel with a plane defined by the bottom panel 4.

In an alternative embodiment (not shown), the flange can include an upper flange portion extending outwardly and upwardly (e.g., having a radius forming a curved or arching structure), terminating in a lower flange portion. The lower flange portion can be formed as a substantially continuous planar surface that is constructed to be in intimate, uninterrupted contact with an upper surface of a steam, or buffet, table that the pan may be placed in contact with. The interface between the pan flange and the steam table preferably forms a seal between the pan and the steam table. The lower flange portion terminates in an outer edge. Preferably, the lower flange portion defines a plane that is substantially parallel with a plane defined by the bottom panel.

Figure 4:
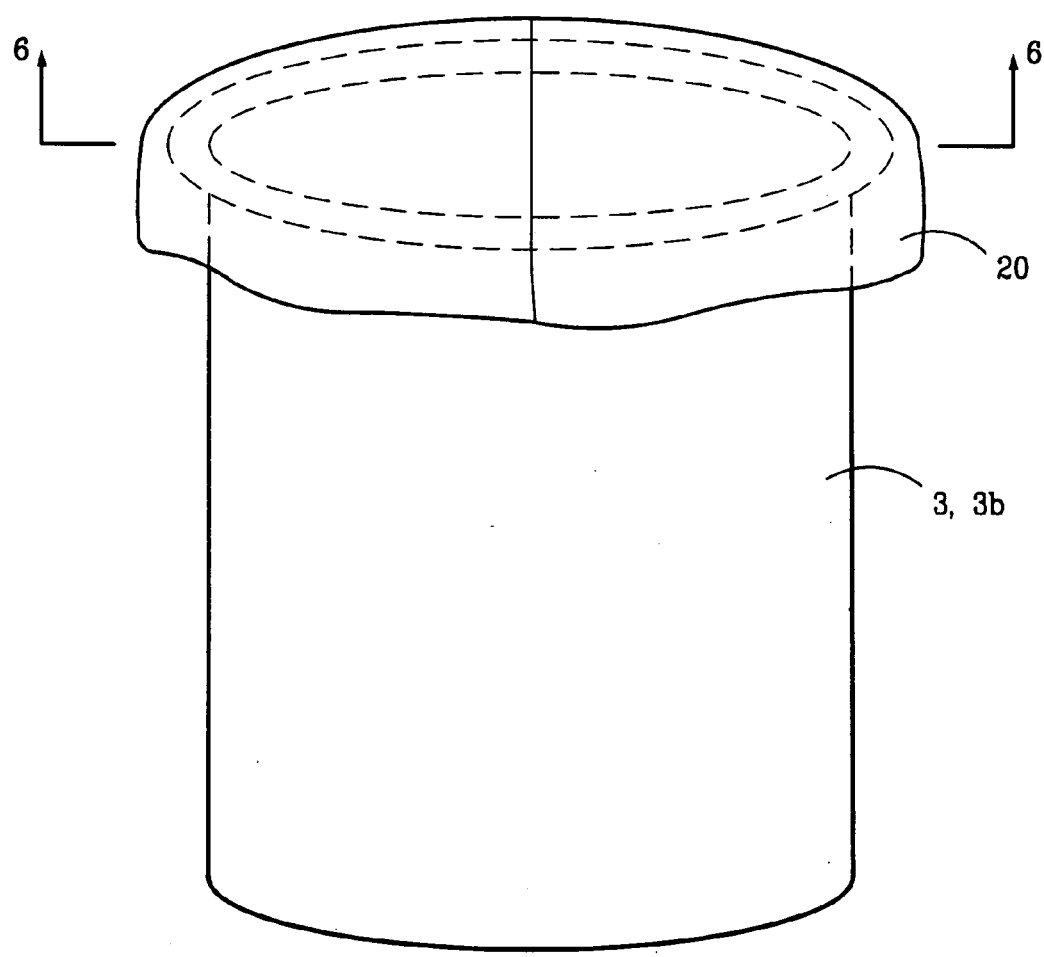
FIG. 4 is a perspective view of another exemplary pan liner system in accordance with the present invention.
Figure 5:
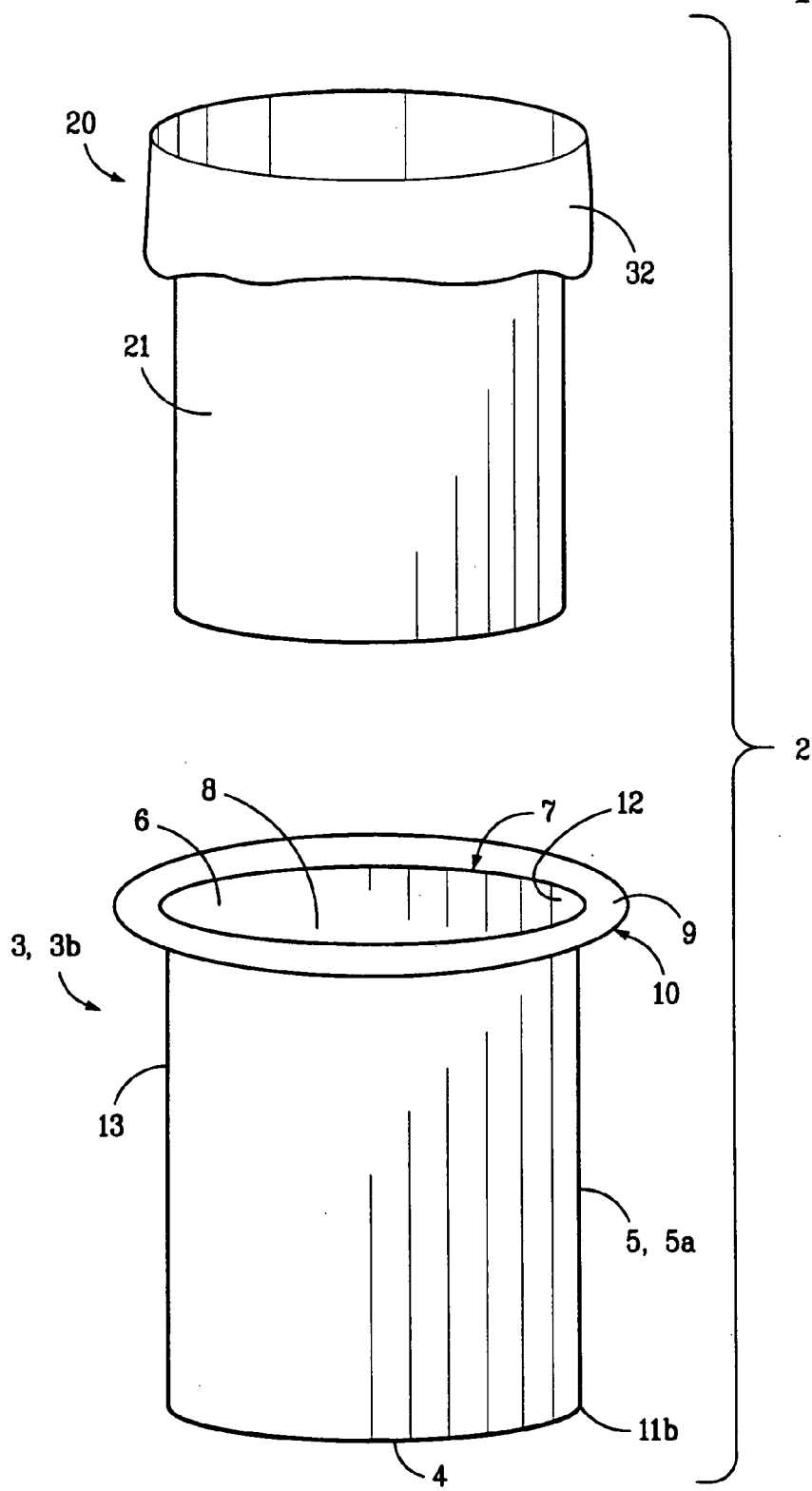
FIG. 5 is an exploded perspective view of the pan liner system of FIG. 4.
Figure 6:
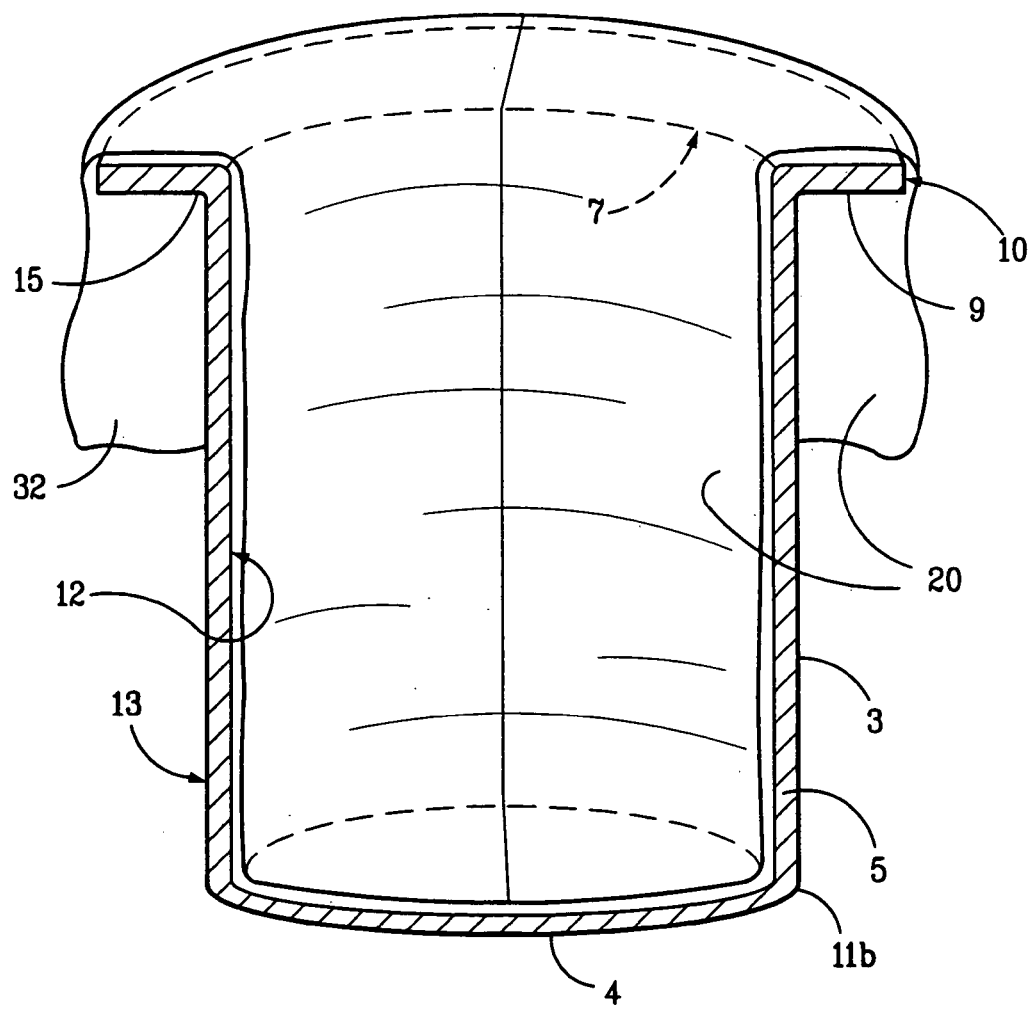
FIG. 6 is a cross sectional view of the pan liner system of FIG. 4 taken along sectional line 6—6.

FIGS. 4 through 6 show an alternative exemplary circular shaped pan liner retention system. As shown, the circular pan 3b can include a circular shaped planar bottom panel 4, a perimetric wall structure 5e extending upward from the circular shaped bottom panel 4, and with an outwardly-extending top flange 9. The flange 9 can be constructed having a similar design as described herein above for the rectangular pan embodiment (e.g., a substantially flat planar flange or a flange having an upper flange portion and a lower flange portion).

Preferably, these pans 3 come in standards shapes and sizes, although custom sizes may be constructed, such that the pan is usable for its intended purpose. For example, the pan's shape can include rectangular, square, triangular, circular, etc. Preferably, the pans include standard food service pans having standard sizes (e.g., L×W×H), such as those shown in FIG. 7.

Figure 7:
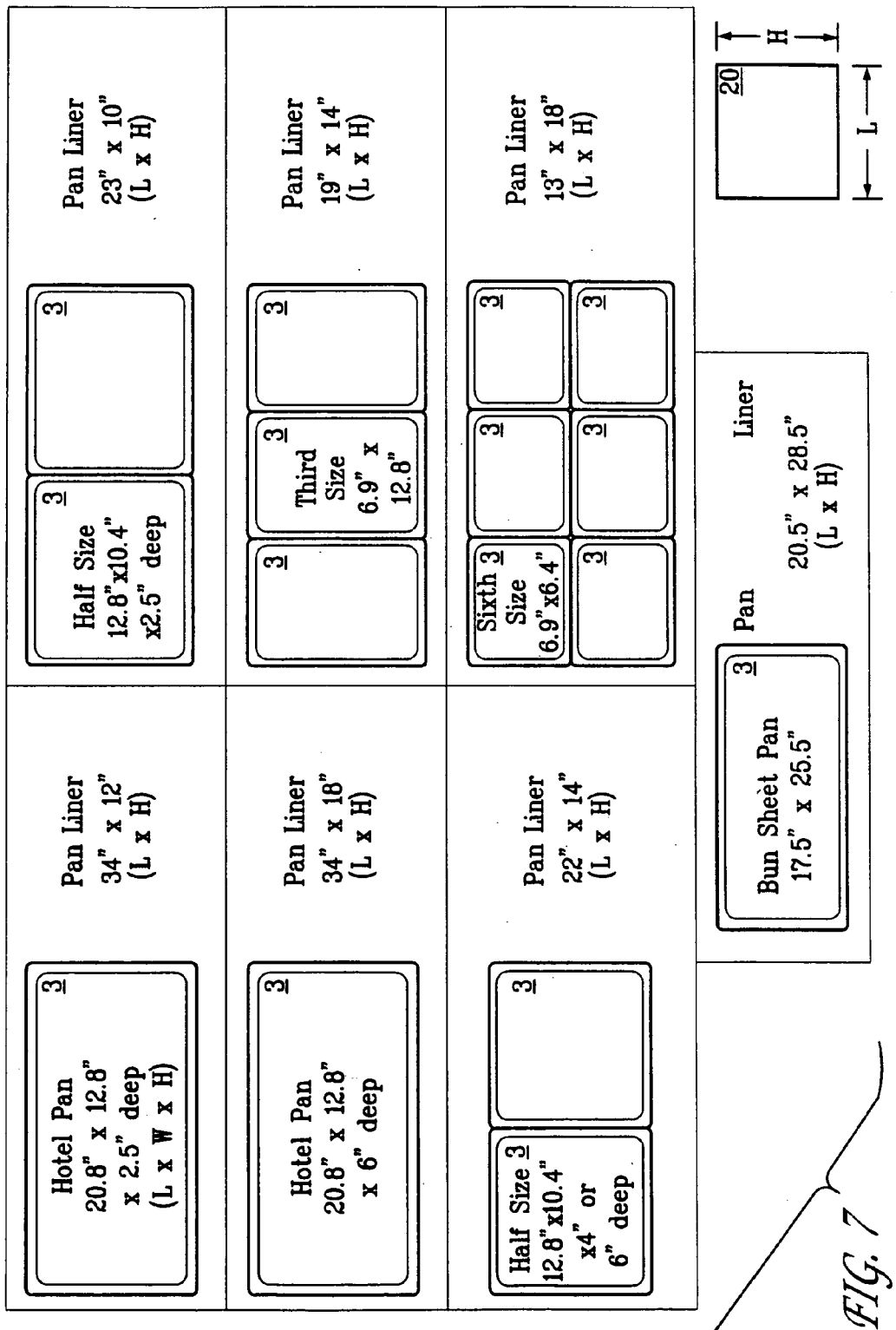
FIG. 7 is a schematic view of standard pan sizes and corresponding liner sizes that can be used with the pan liner system of FIG. 1.

For example, exemplary commercially available pans 3 can include, a hotel pan, a half size, a third size, a sixth size, etc., as shown in FIG. 7. These pans 3 can have a generally rectangular configuration as shown in more detail in FIGS. 1 through 3. As shown, the rectangular pan 3 including front 5a, rear 5b, right 5c and left 5d side walls extending upwardly from a substantially planar bottom 4, with a top flange 9 extending outwardly from a top edge 7 of the walls 5. Corners 11a join each of the adjacent side walls 5 and corners 11b join each of the side walls 5 to the bottom 4. Preferably, but not necessarily, the corners 11a, 11b are formed as curved, or rounded, corners.

Table 1 shows some standard pan sizes used in industrial and commercial kitchens.

TABLE 1

Standard Size Pans.

| Pan Description | Pan Size (L × W) | Pan Depth (H) |
| --- | --- | --- |
| Half Pan-Shallow | 12.8" × 10.4" | 2.5" |
| Half Pan-Medium & Deep | 12.8" × 10.4" | 4" & 6" |
| Third & Quarter Pan-Medium & Deep | 12.8" × 6.9" | 4" & 6" |
| Third & Quarter Pan-Shallow | 12.8" × 6.9" | 2.5" |
| Sixth Pan | 6.4" × 6.9" | 6" |
| Hotel Pan-Shallow & Medium | 12.8" × 20.8" | 2.5" & 6" |
| Hotel Pan-Deep | 12.8" × 20.8" | 6" |
| 2 Quart Round | | 8.2" |
| 4 Quart Round | | 8.2" |
| 6 & 7 Quart Round | | 8.2" |
| 9 & 11 Quart Round | | 8.2" |
| Bun Sheet Pan | 18.5" × 26.5" | n/a |
| G.I. Roasting Pan | 20" × 17" | 6.5" |
| Large Roasting Pan | 25.5" × 17.5" | 4" |

Although described and shown with reference to an exemplary pan (e.g., rectangular), the scope of the present invention contemplates the use of the pan liner system 2 with other cooking and food storage devices, including for example, pots, trays, containers, kettles, bowls, and the like.

These cooking, transportation, and storage devices (e.g., pans) can have a variety of shapes and sizes. Preferably, the cooking, transportation, and storage devices are standard sizes and shapes that are currently used within the food service industry. Alternatively, custom sizes can be manufactured and used. The liner can be sized accordingly to cover the interior surface of the cooking device and to have excess material that can be folded over the top edge of the pan.

Referring back to FIGS. 1 through 6, the pan liner system 2 includes a removable, flexible, high temperature, plastic liner 20 that is disposed within the pan 3 to cover an interior surface 12 of the pan 3. The pan liner 20 is provided to keep food separate from the interior surfaces 12 of the pan 3 thereby improving food safety and quality, enhancing flavor and juiciness of foods, minimizing clean up time, pan washing and resource consumption, reducing shrinkage by allowing left over food to be removed from the pan and saved in the liner for further use, etc. Pan liner 20 can be used in food preparation, cooking, and holding to prevent food from "baking-on" and "burning-on" to the pan surface.

As shown in FIGS. 1 through 6 and in more detail in FIGS. 8 through 12, the exemplary liner 20 includes a preformed substantially tubule, or bag-like, shaped body 21. The body 21 includes a closed bottom end 22, one or more upwardly extending side walls 26, and an open top end 23. The closed bottom end 22 is formed having a contoured or shaped bottom edge 24 that is constructed to fit within and conform to the shape of the pan 3 and food receptacle 8. The bottom contoured edge 24 is preferably contoured or customed shaped to the particular pan or receptacle.

The contour bottom edge 24 eliminates, closes, or seals off the dog ear, ears, or tails 25 that are typical of conventional pan liners proximate the corner areas formed between the bottom edge and the side walls. The dog ears, ears, or tails 25 of the liner can be eliminated by either sealing or bonding the side walls together, as shown, thereby closing off the dog ear portion 25 of the liner 20. The unused (e.g., closed off) material of the dog ear 25 can be left in place on the liner, or it can be removed at some time prior to using the liner 20.

One or more flexible side walls 26 extend upwardly from the contoured bottom edge 24, and an opening 27 is formed at the opposite top end 23 by a top edge 29 of each of the side walls 26. The one or more side walls 26 are connected together, preferably along one or more sealed edges 30.

The closed contoured bottom edge 24 and the upwardly extending side walls 26 define a food holding vessel 31 capable of fitting within a pan and holding a volume of food that may be disposed therein. Preferably, the liner 20 is generously sized to afford complete coverage of the receptacle 8 (e.g., the food contact area) of each pan 3 and allows an excess portion 32 of the liner 20 proximate the top end 23 to be folded outwardly over the top edge 7 and flange 9 of pan 3, as best shown in FIGS. 2, 3, 5, and 6.

Although some forming may occur once the liner 20 has been disposed within a pan 3, such as moisture adhesion and thermal-forming as the pan is heated, the liner 20 is preferably substantially preformed having a closed bottom end 22 and upwardly extend sidewalls 26 which define the food holding vessel 31 which fits within and covers the interior surface 12 of the pan 3. In addition, the weight of the food may also exert some pressure on the liner which also helps to further form the pan liner to the pan.

Figure 8A:
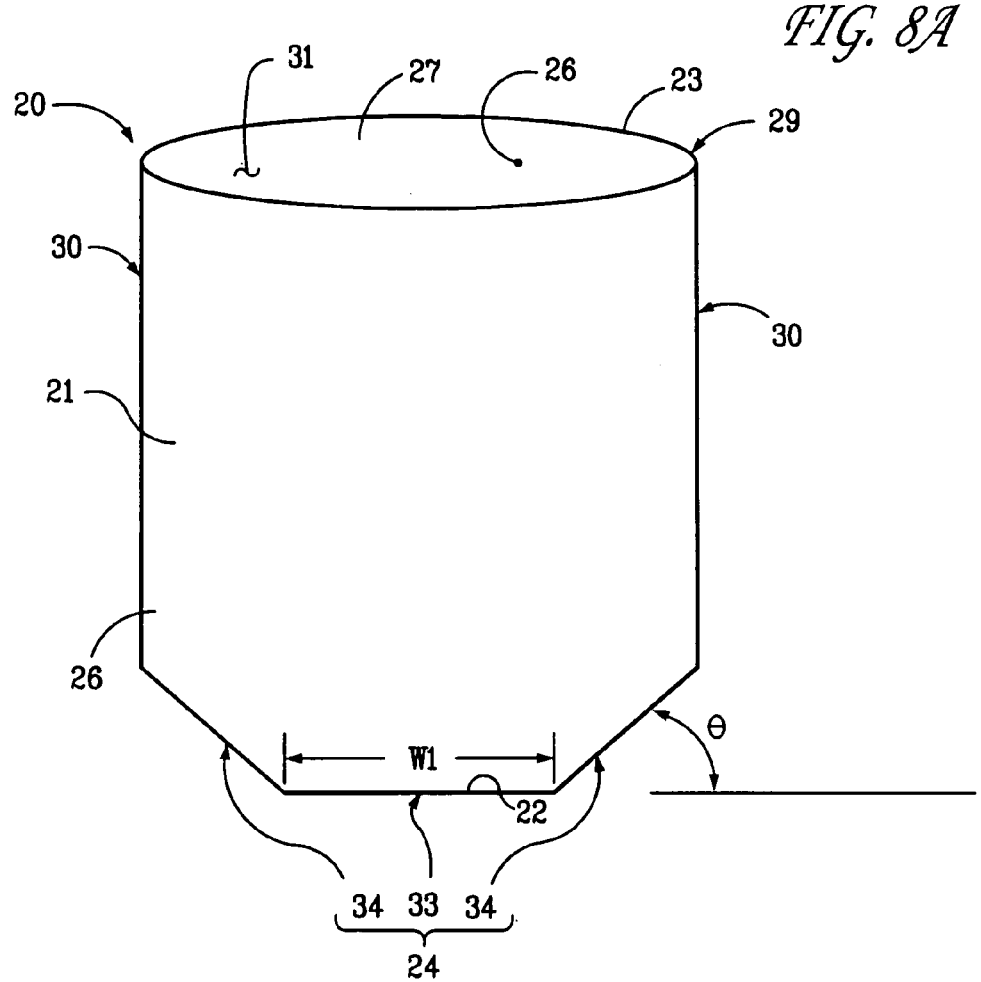
FIG. 8A is a front perspective view of an exemplary contour fit pan liner in accordance with the present invention.
Figure 8B:
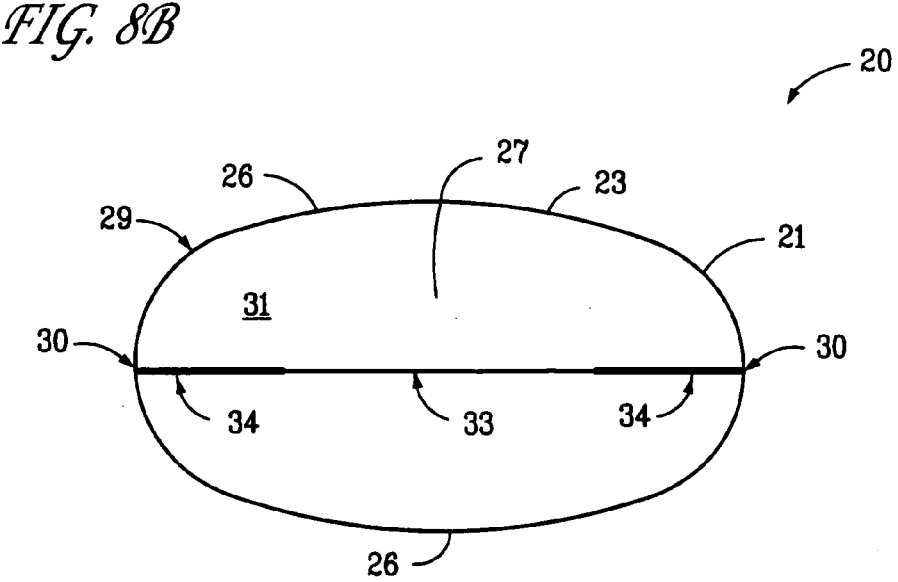
FIG. 8B is a top view of the contour fit pan liner of FIG. 8A.
Figure 9:
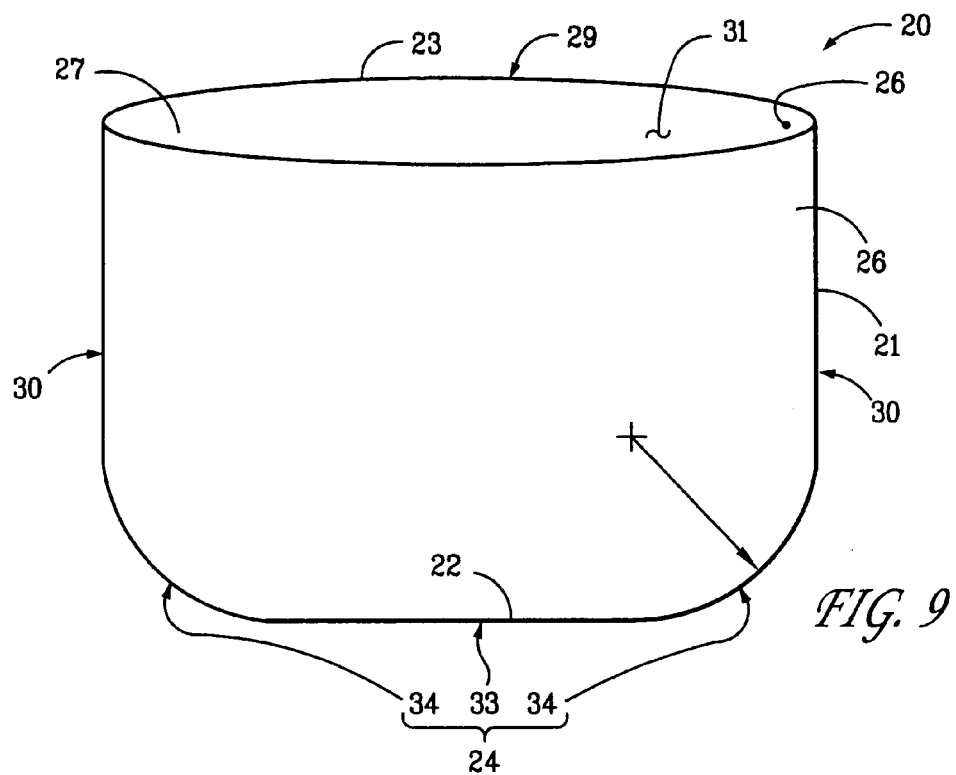
FIG. 9 is a front perspective view of another exemplary contour fit pan liner in accordance with the present invention.

FIGS. 8A, 8B, and 9 show the bottom contoured edge 24 having a flat bottom edge 33 and one or more contoured or shaped edges 34. Each contoured edge 34 extends outward and upward from the flat bottom edge 33 and joins and merges an opposite end of the flat bottom edge 33 with one or more of the side wall edges 30. As shown, the liner 20 is formed having two side walls 26 that can be sealed or joined together using conventional techniques thus forming one or more sealed side wall edges 30. The closed bottom end 22 can be closed by using conventional techniques, such as for example, sealing, bonding, adhesion, or the like. For example, the entire contoured bottom edge 24 can be formed by a conventional sealing technique, or preferably, the flat bottom edge 33 can be formed by folding over a single flat sheet of plastic material such that the folded edge forms the flat bottom edge 33. The contoured edges 34 can then be closed using conventional sealing or bonding techniques.

FIG. 8A shows the bottom contoured edge 24 having a flat bottom edge 33 and one or more contoured or shaped edges 34, wherein the contoured edges 34 include one or more tapered, or sloped, edges. Each tapered edge 34 extends outward and upward from the flat bottom edge 33 and joins and merges an opposite end of the flat bottom edge 33 with one or more of the side wall sealed edges 30. The tapered edges 34 form an angle θ from a plane defined by the flat bottom edge 33. The angle θ is predetermined and can vary based on the particular application and the shape and size of the pan 3 that the contour fit liner 20 will be used in. Preferably the angle θ forms an angle between about 40 and about 55 degrees.

FIG. 8B shows a top view of the exemplary contour fit pan liner 20 of FIG. 8A. As shown, the liner 20 includes two side walls 26 that extend upward from the contoured bottom edge, 24. The two side walls 26 are joined or connected together at seal edges 30.

FIG. 9 shows the contoured bottom edge 24 having a flat bottom edge 33 and one or more contoured or shaped edges 34, wherein the contoured edges 34 include one or more rounded or curved edges. Each rounded or curved edge 34 extends outward and upward from the flat bottom edge 33 and joins and merges an opposite end of the flat bottom edge 33 with one or more of the side wall edges 30. The rounded edges 34 form a radius R from a point within the food holding vessel 31 of the contour fit liner 20. The radius R is predetermined and can vary based on the particular application and the shape and size of the pan that the contour fit liner will be used in.

In addition, the width WI of the flat bottom edge 33 can also vary in length and is predetermined based on the particular application and the shape and size of the pan. Preferably, the width WI would increase as the pan size increases and the width W would decrease as the pan size decreases. For example, for an exemplary conical shaped pan, the contour fit liner can be formed with a minimal, or no, flat bottom edge 33, such that the contour edge 24 includes two contoured or shaped edges 34 that connect together at one end and connect and join the side wall edges 30 at the opposite end, such as for example, the tapered edges 34 as shown in FIG. 10.

Figure 10:
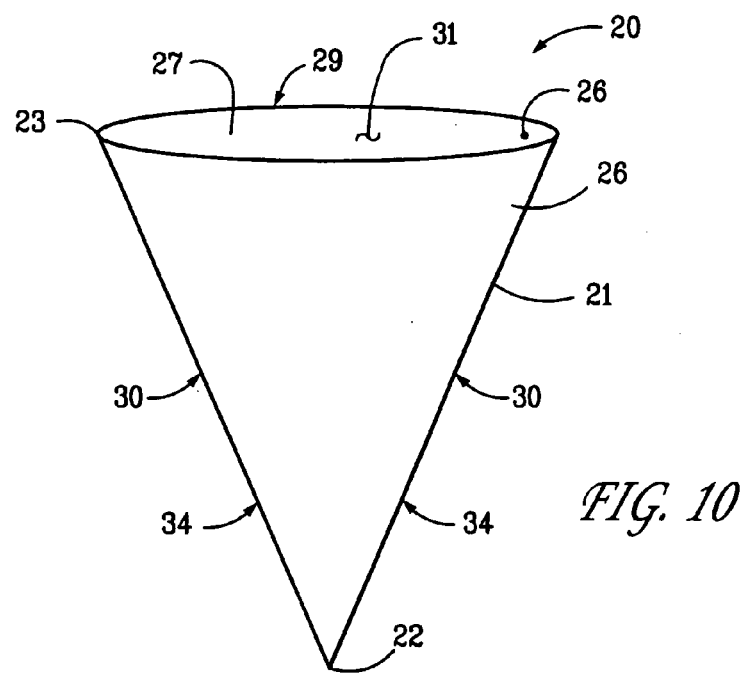
FIG. 10 is a front perspective view of another exemplary contour fit pan liner in accordance with the present invention.
Figure 11:
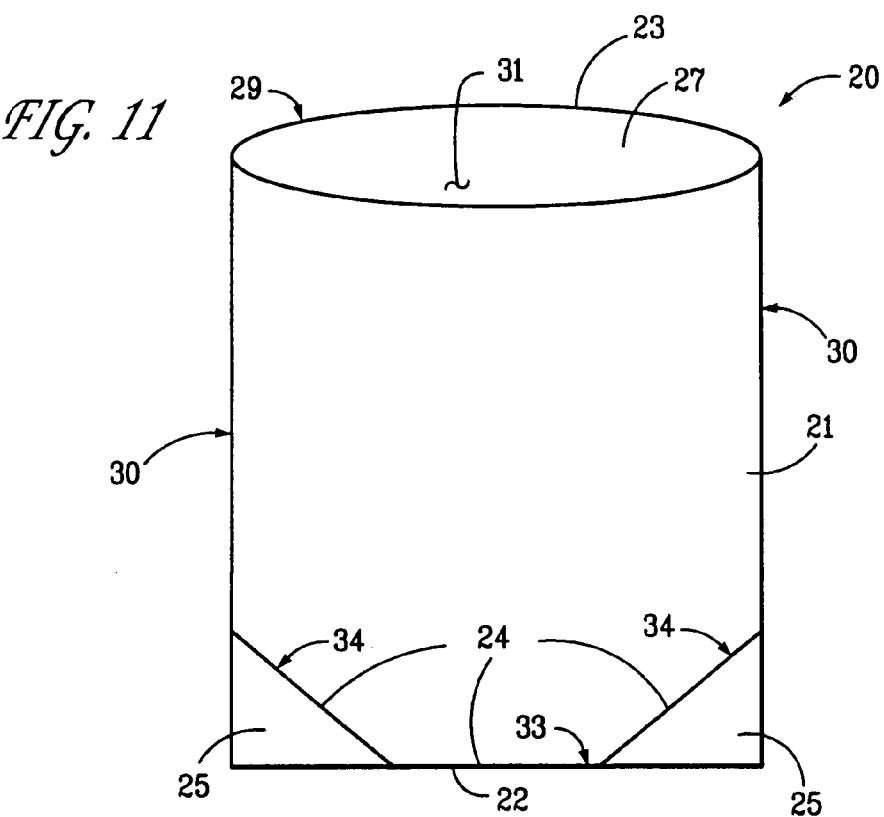
FIG. 11 is a front perspective view of another exemplary contour fit pan liner in accordance with the present invention.

FIGS. 8, 9, and 10 show pan liners having a contoured bottom edge 24 wherein the dog ears 25 have been removed. Alternatively, the dog ears 25 can be left on and never removed, or left on until just prior to using the liner 20, at which time the dog ears 25 can be removed. FIG. 11 shows an exemplary liner 20 having a contoured bottom edge 24 wherein the dog ears 25 are still attached to the liner 20. The flat bottom edge 33, the tapered edges 34, and the side walls 26 have been closed to form a vessel 31 capable of holding food. The material of the dog ears 25 is not used and food cannot enter that area because it has been closed, or sealed, by the tapered edges 34.

Figure 12:
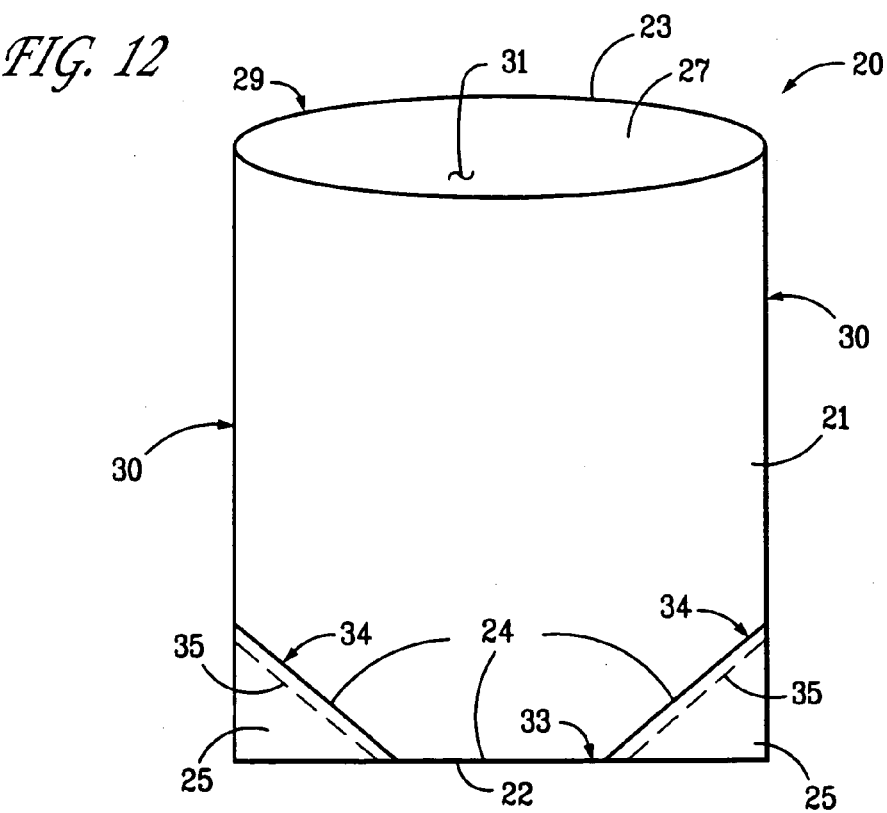
FIG. 12 is a front perspective view of another exemplary contour fit pan liner in accordance with the present invention.

FIG. 12 show a liner 20 having a contoured bottom edge 24 including a perforation 35 formed parallel along each of the sealed contoured edges 34 on the dog ear side of the sealed contoured edge 24. The perforated edge 35 can be made using a cutting device to make a plurality of serially aligned cuts, or slots in a line that is substantially parallel to the contoured edge 34 and on the dog ear side of the contoured edge 34. These perforations 35 allow the dog ears 25 to be easily removed either after the manufacturing process or just prior to use.

Preferably, a standard size contour fit liner 20, fitted to a standard size pan, is disposed within the receptacle 8 of the pan 3 to line and cover an interior surface 12 of the receptacle 8 and the top edge 29 and the excess portion 32 of the liner 20 are folded over the top edge 7 and flange 9 of pan 3 such that the excess liner material 32 skirts the flange 9 and exterior surface 13 of pan 3.

The liner 20, like the pan 3, can include a variety of shapes and sizes. Preferably, the shape and size of the liner 20 correspond to the shape and the size of the pan 3 that the liner 20 will be used with. Preferably, the pans include standard food service pans having standard sizes and the liners include standard size liners (L×H), such as those shown in FIG. 7.

Referring back to FIG. 7, shown are standard pan sizes for rectangular shaped pans 3 used in industrial and commercial kitchens and corresponding exemplary pan liner sizes that can be used with the present invention. As can be seen from FIG. 7, the pan liners are generously sized in comparison to the corresponding pan size. This ensures adequate coverage of the pan receptacle and also provides excess liner material proximate the open top end of the liner. This excess liner material 32 at the top end 23 can be folded outwardly over the top edge 7 and flange 9 of pan 3 such that the excess material 32 skirts the exterior surface 13 of the pan 3, as shown in FIGS. 1 and 3.

The liner material is preferably suitable for continuous service under various conditions and preferably has the following characteristics: suitable for temperature conditions ranging from about −100° F. to about +400° F.; has a good thermal heat transfer rate; has a tensile strength capable of withstanding approximately 13,000 psi without orientation; has a tear strength capable of holding up to about 50 grams/liter; has a tabor strength capable of sustaining about 1000 cycles tested with a load of about 500 grams; has a chemical resistance to most chemicals, such as mineral acids, phenols and concentrated formic acid; has a bacterial and mold resistance making it rotproof and resistant to molds and impermeable to micro-organisms; acts as an odor barrier to most odors; has a grease and oil resistance having an oil-barrier properties effective against animal, vegetable, and mineral oils and fats; allows some moisture-vapor transmission at raised temperatures; is gas impermeable which makes the liner well suited for packaging under nitrogen, carbon dioxide, or vacuum, and is resistant to oxygen permeation which reduces fogging in frozen foods and helps extend shelf-life; is non-scalping (e.g., no flavor loss); and will not block (e.g., will not stick together). The contour fit pan liner is safe to use in most conventional cooking devices, such as ovens, microwaves, slow cookers, steamers, flat-tops, crock pots, pressure cookers, and the like.

Preferably, the liner 20 is made from a durable and high temperature plastic material or nylon film, such as a nylon resin. For example, the liner can be made from a high temperature nylon or polyester, such as a material from the polyamide family including nylon 3, 4, 6, 9, 11, 12, and triple nylons. An exemplary nylon resin material that is suitable for use with the present invention includes MONO-LYN® material manufactured by M&Q Plastic Products, of North Wales, Pa.

Figure 13:
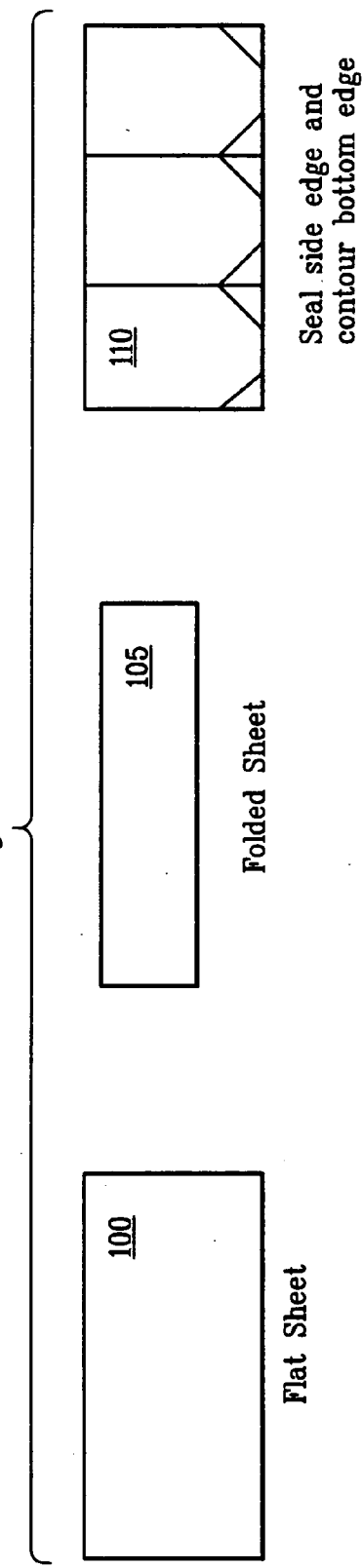
FIG. 13 is a flow diagram of an exemplary method of making the contour fit pan liner of the present invention.
Figure 13:
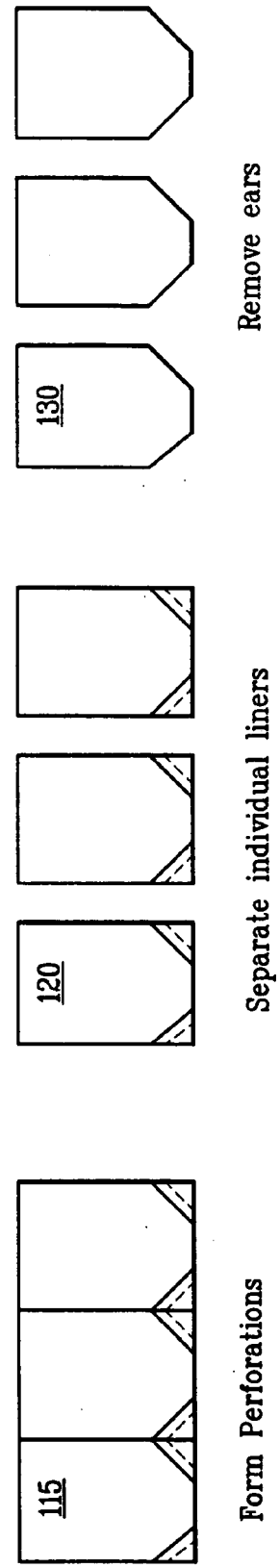

FIG. 13 is a flowchart diagram showing an exemplary method of making the contour fit liner of the present invention for lining an interior surface of a pan/receptacle. As shown in FIG. 13, a sheet of plastic material is provided at step 100. The plastic sheet material is folded over along its longitudinal length, at step 105. A sealing device is used to seal one or more side edges and the bottom contoured edge of the folded over material at step 110. This results in one or more contour fit liners having a sealed bottom end, one or more side walls extending upwardly from the bottom end, and an opening defined by an upper edge of the liner side walls.

The bottom contoured edge along the bottom end of the liner can include a variety of shapes depending on the application and the pan that the liner will be used with. As shown, the bottom contoured edge includes a flat bottom edge and two tapered or sloped edges. Each tapered edge is formed between and connecting an end of the flat bottom edge to a side wall edge. The sealing is preferably accomplished using conventional sealing techniques, such as for example, heat or thermo-sealing, impulse-sealing, sonic-sealing, RF-sealing, etc. This forms one or more contour fit pan liners. Alternatively, the edges can be closed using other conventional techniques, such as a bonding material, an adhesion, etc.

Alternatively, the contour fit pan liner resulting from the above steps 100–110 can be accomplished by overlying two separate sheets of material one over the other instead of folding over a single sheet of material. It is preferred to use the folded-over approach because this provides a closed edge along the fold line thereby forming the flat bottom edge, and thus less sealing is required.

Also, in an alternative embodiment (not shown), the contoured bottom edge could be formed using one or more folds proximate the closed bottom, such as a gusset.

A perforated edge can be formed at step 115 along each of the sealed contoured edges on the dog ear side of the seal away of the interior food holding portion of the liner. The perforated edge can be formed using conventional techniques, such as using one or more blades to cut a plurality of serially-aligned slots in the liner material. Alternatively, the ears can be left on the contour fit liner and not used, or the dog ears can be cut and removed from the liner.

The individual contour fit liners can then be separated from one another at step 120 using a cutting device. Preferably, where multiple liners are made together, either two seals are formed parallel to one another during the sealing process, or a sufficiently wide seal is made to allow adjoining liner to be cut and separated form one another while still maintaining the seal edge along the edges of adjoining side walls.

As stated earlier, the dog ears can be left on the liner and not used. Preferably, the dog ears 25 are removed at step 130 before the contour fit liner 20 is used in a pan 3 to form a barrier between the pan and food that is held in the food receptacle of the pan. The dog ears 25 can be removed during the manufacture process of the contour fit liner, or alternatively, just prior to use. Where the dog ears are left on and then removed just prior to use, a perforated edge 35 is preferably formed along the sealed contoured edge 34 to assist with the removal of the dog ear 25.

For example, in one embodiment, the dog ears can be left on the liner after the manufacturing process and then removed by an end user of the liner just prior to use. To assist in the storage of the liners prior to use and to assist in the removal of the dog ears prior to use, a dispensing system 40 can be employed to hold and store a plurality of contour fit liners 20 until they are used. The dispensing system 40 would preferably be constructed such that the dog ears are removed as each liner is removed from the dispensing system 40.

Figure 14A:
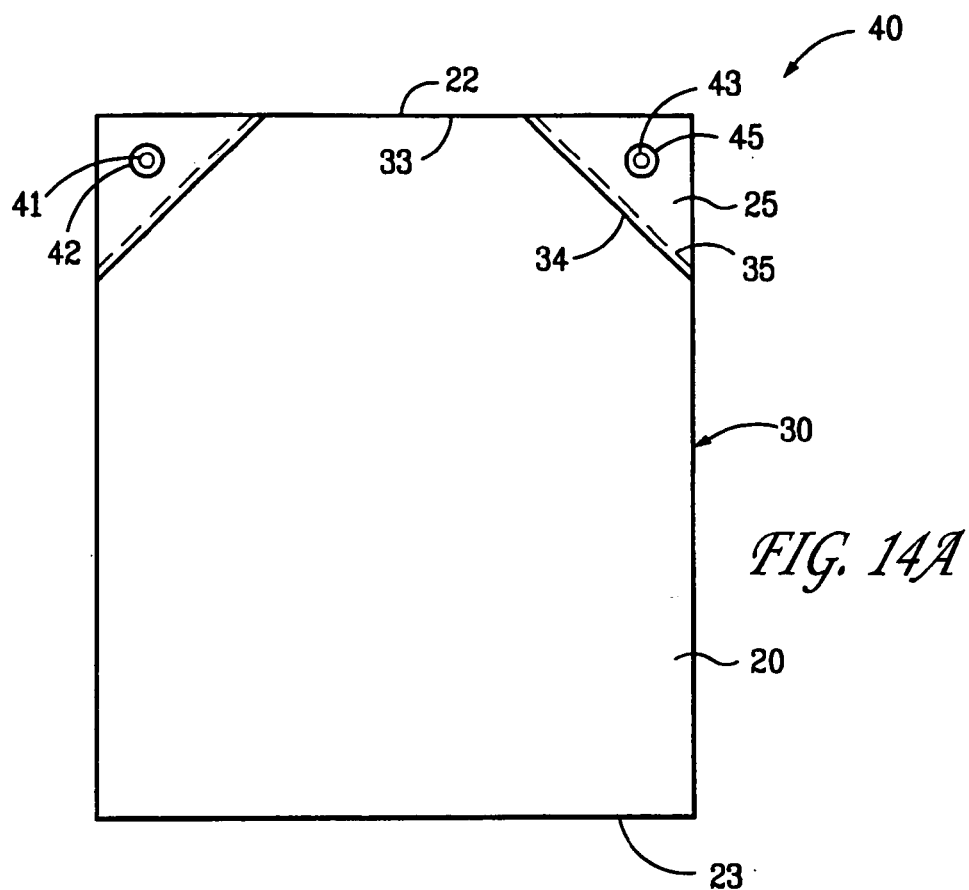
FIG. 14A is a front view of an exemplary dispensing system for the contour fit pan liner in accordance with the present invention.
Figure 14B:
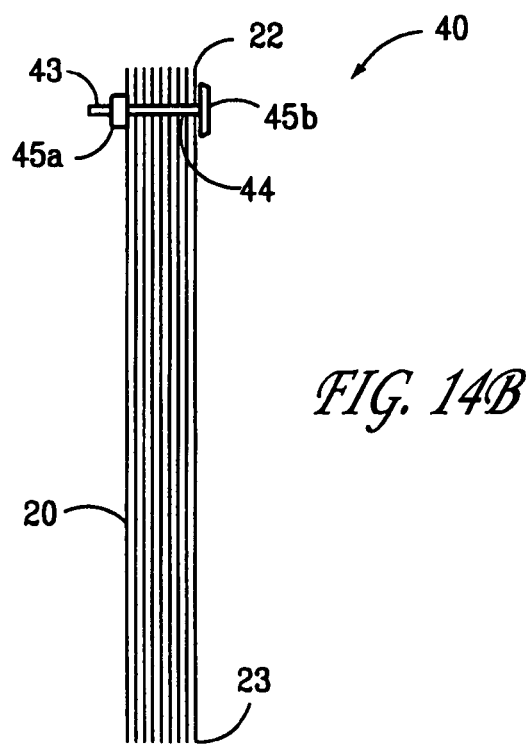
FIG. 14B is a side view of the exemplary dispensing system of FIG. 14A.

FIGS. 14A and 14B show an exemplary dispensing system 40 that can include a support structure 41 and a retaining structure 42, such as a wickett or the like. As shown in FIGS. 14A and 14B, the dispensing system 40 includes a support structure 41 having one or more support members 43 that extend through an opening 44 formed in each of the dog ears 25 of the liners 20, and a retaining structure 42 having one of more stops 45 for holding the liners on the support members 43.

Preferably, the dispensing system 40 includes two support members 43 positioned proximate to and extending through a center region of each of the dog ears and a rear stop 45a and a front stop 45b positioned on opposite ends of each support member 43 to hold the pan liners therebetween. The rear stop 45a and the front stop 45b preferably are positioned on each of the support members 43 such that the plurality of liners are compressed therebetween with a compressive force sufficient to tear-off the dog ears 25 along the perforated edge 35 and hold the dog ears 25 in place in the dispensing system 40.

In another embodiment (not shown), the dispensing system 40 can also include a housing for holding the plurality of liners during shipment and storage of the individual liners prior to use. For example, the housing can include a cardboard box like structure having a removable or selectively movably cover that can be opened to obtain an individual pan liner and then the cover could be replaced or closed until another pan liner is needed.

When a contour fit pan liner 20 is needed to cover an interior surface of a pan 3, the next liner in the dispensing system 40 can be grasped at the free end (e.g., the open top end 23 of the liner) and the liner 20 is pulled away from the dispensing system 40. This allows the liner to be removed leaving the dog ears 25 behind in the dispensing system 40.

Although described and shown with reference to an exemplary food service pan application, the scope of the present invention contemplates the use of the contour fit pan liner system with other applications, including for example, medical, environmental, automotive, chemical, hazardous waste, and the like. Preferably, the contour fit pan liners are constructed to fit standard sizes and shapes of pan or receptacles that are used within the particular industry and for the particular application within an industry. Alternatively, custom sizes can be manufactured and used.

Although illustrated and described herein with reference to certain specific embodiments, it will be understood by those skilled in the art that the invention is not limited to the embodiments specifically disclosed herein. Those skilled in the art also will appreciate that many other variations of the specific embodiments described herein are intended to be within the scope of the invention as defined by the following claims.

What is claimed is:

1. A food pan liner system, comprising:
 a pan; and
 a pan liner for lining said pan, said pan liner formed with two polymeric sides meeting at side edges and at a single contoured bottom edge and having open top edges, said contoured bottom edge having a single central edge portion and two contoured edge portions extending outwardly from each end of the single central edge to meet said side edges, with said polymeric sides bonded together along at least said two contoured edge portions and said side edges.

2. The system of claim 1 wherein said pan liner is made from a polymeric material capable of withstanding a temperature of at least 400 degrees Fahrenheit.

3. The system of claim 1 wherein said pan liner is formed from a single sheet of polymeric material folded at said single central edge portion to define said two polymeric sides.

4. The system of claim 3 wherein said sides of said folded sheet of polymeric material are joined in two continuous bonds, each extending along one of said contoured edge portions and an adjoining one of said side edges.

5. The system of claim 1, wherein each of said contoured edge portions comprises a substantially linear tapered edge.

6. The system of claim 5, wherein said single central edge is substantially linear and intersects each of said tapered edges at an angle determined based on a shape and size of said pan.

7. The system of claim 6, wherein said angle is between about 40 degrees and about 55 degrees.

8. The system of claim 1 wherein each of said contoured edge portions comprises a curved edge.

9. The system of claim 8, wherein each of said curved edges is formed having a radius that is determined based on a shape and size of said pan.

10. The system of claim 1 wherein said polymeric sides are generally rectangular and include dog ear portions adjacent to said contoured edge portions and separated from an interior of said pan liner by said contoured edge portions.

11. The system of claim 1 wherein dog ear portions adjacent to said contoured edge portions have been removed from said polymeric sides.

12. A food pan liner system, comprising:
 pan means for holding food items during preparation or service thereof;
 liner means for lining said pan, said liner means formed as a bag comprising two polymeric sides meeting at sealed side edges and having open top edges;
 contoured bottom edge means for providing a sealed bottom of said liner means and preventing the collection of food in a corner of said liner means when installed in said pan means, said contoured bottom edge means having a single central edge portion and two contoured edge portions extending from each end of the single central edge portion to meet said side edges.

13. The system of claim 12, wherein said liner means is made from a polymeric material capable of withstanding a temperature of at least 400 degrees Fahrenheit.

14. The system of claim 12, wherein said pan liner is formed from a single sheet of polymeric material folded at said single central edge to define said two polymeric sides.

15. The system of claim 14, wherein said contoured bottom edge means comprises two continuous bonds, each extending along one of said contoured edge portions and an adjoining one of said side edges.

16. The system of claim 12, wherein each of said contoured edge portions comprise a substantially linear tapered edge.

17. The system of claim 16, wherein said single central edge portion is substantially linear and intersects each of said tapered edges at an angle determined based on a shape and size of said pan.

18. The system of claim 17, wherein said angle is between about 40 degrees and about 55 degrees.

19. The system of claim 12, wherein each of said contoured edge portions comprises a curved edge.

20. The system of claim 19, wherein each of said curved edges is formed having a radius that is determined based on a shape and size of said pan.

21. The system of claim 12, wherein said polymeric sides are generally rectangular and include dog ear portions adjacent to said contoured edge portions and separated from an interior of said pan liner by said contoured edge portions.

22. The system of claim 12 wherein dog ear portions adjacent to said contoured edge portions have been removed from said polymeric sides.

23. A pan liner system for use in food preparation, comprising:
 a pan; and
 a pan liner for lining said pan, said pan liner being formed from a polymeric material capable of withstanding a temperature of at least about 400 degrees Fahrenheit, said polymeric material being formed in the shape of a bag having side edges and a contoured bottom edge, said contoured bottom edge having a single substantially linear central edge portion and two contoured edge portions, each of said contoured edge portions extending from a respective end of the single central edge portion and joined to one of said side edges, whereby said contoured edge portions substantially eliminate entrapment of food occurring in corners of bags lacking said contoured edge portions.

24. The pan liner system of claim 23, wherein said polymeric material comprises a nylon resin.

25. The pan liner system of claim 24, wherein said nylon resin comprises nylon.

26. The pan liner system of claim 23, wherein said polymeric material comprises polyester.

27. A food service system, comprising:
 a food serving pan comprising:
  a bottom panel, and
  one or more side walls extending upwardly from said bottom panel, said one or more side walls each having a top edge, said top edge defining a pan top opening;
 a drop-in polymeric pan liner comprising a single layer film having a pre-formed bag-shaped body independent of said pan and having a contour fit disposed within said pan to cover an interior surface of said pan, said bag-shaped body comprising:
  two flexible side walls each having two side wall edges located at respective ends of said side walls, said side walls joined together at said two side wall edges;
  a contoured bottom edge that does not include dog ears, forming a closed bottom end at a junction of said two flexible side walls, wherein said contoured bottom edge has a single substantially linear flat bottom edge portion lying substantially parallel to said bottom panel of said pan when installed therein and two contoured edge portions, each contoured edge portion joining said flat bottom edge portion to a respective side wall edge; and an open top end, said top end extending upwardly beyond said pan top opening and being folded over said top edge of said one or more side walls of said pan.

28. The food service system of claim 27, wherein said pan liner is capable of maintaining the quality of food that is exposed to heat for an extended period of service time by preventing direct contact with said pan, thereby decreasing moisture loss from the food and preventing the food from baking-on or burning-on said pan.

29. A food preparation and service system, comprising:
a standard commercial pan comprising:
  a bottom panel, and
  one or more side walls extending upwardly from said bottom panel, said one or more side walls each having a top edge, said top edge defining a pan top opening; and
a single layer drop-in polymeric pan liner having a pre-formed contour fit disposed within said pan to cover an interior surface of said pan, said contour fit pan liner comprising:
  one and only one contoured bottom edge forming a closed bottom end disposed over said pan proximate said bottom panel, wherein said contoured bottom edge does not have dog ears, thereby reducing entrapment of food portions proximate said contoured bottom edge, said contoured bottom edge having one flat bottom edge portion and two contoured edge portions, wherein said flat bottom edge portion is joined and merged at each end with one of said contoured edge portions, and said contoured edge portions extend from said flat bottom edge and are joined and merged at an opposite end with a side wall edge;
  two flexible side walls extending upwardly from said bottom end, wherein said side walls and said bottom end generally cover said interior surface of said pan, and
  an open top end extending upwardly beyond said pan top opening and being folded over said top edge of said one or more side walls of said pan.

30. The food preparation and service system of claim 29, wherein said pan liner is capable of withstanding a temperature of about 400 degrees Fahrenheit.

31. A pan liner system for forming an improved barrier between a pan and food disposed therein, said pan liner system comprising:
a pan comprising:
  a bottom panel, and
  one or more side walls extending upwardly from said bottom panel, said one or more side walls each having a top edge, said top edge defining a pan top opening; and
a drop-in polymeric pan liner having a contour fit and suitable for food service applications disposed within said pan to cover an interior surface of said pan,
said contour fit pan liner further comprising a single layer film and a pre-formed bag-shaped body independent of said pan, said pre-formed bag-shaped body having:
  a single contoured bottom edge forming a closed bottom end disposed over said pan proximate said bottom panel, wherein said contoured bottom edge has a flat bottom edge portion and contoured edge portions extending from said flat bottom edge portion, with said flat bottom edge portion joined and merged at each end with one of said contoured edge portions,
  one or more flexible side walls extending upwardly from said contoured edge portions, wherein said side walls and said bottom end generally cover said interior surface of said pan, and
  an open top end, said top end extending upwardly beyond said pan top opening and said liner open top end being folded over said top edge of said one or more side walls of said pan,
  wherein said pan liner does not have dog ears formed proximate said closed bottom end, thereby preventing entrapment of food portions, and
  wherein said pan liner is capable of withstanding a temperature of about 400 degrees Fahrenheit.

32. The pan liner system of claim 31, wherein said single contoured bottom edge consists essentially of a single flat bottom edge portion and exactly two contoured edge portions.

33. The pan liner system of claim 31, wherein each of said contoured edge portions comprises a substantially straight tapered edge.

34. The pan liner system of claim 33, wherein each of said tapered edges is formed having a predetermined angle from a line defined by said flat bottom edge portion, wherein said angle is predetermined based on a shape and size of said pan.

35. The pan liner system of claim 31, wherein each of said tapered edges forms an angle of about 40 to about 55 degrees with a line defined by said flat bottom edge portion.

36. The pan liner system of claim 31, wherein each of said contoured edge portions comprises a curved edge.

37. The pan liner system of claim 36, wherein each of said curved edges is formed having a radius that is predetermined based on a shape and size of said pan.

38. The pan liner system of claim 31, wherein said contour fit pan liner is removably disposed within said pan.

39. The pan liner system of claim 31, wherein said pan liner is constructed from a high temperature polyamide or polyester.

40. The pan liner system of claim 31, wherein said pan liner has a tensile strength of about 13,000 p.s.i.

41. The pan liner system of claim 31, wherein said pan liner is non-blocking.

42. The pan liner system of claim 31, wherein said pan liner is designed to fit within a standard commercial sized and configured pan.

43. The pan liner system of claim 42, wherein said pan has a shape selected from the group consisting of rectangular, square, triangular and circular.

* * * * *